Figure 1:
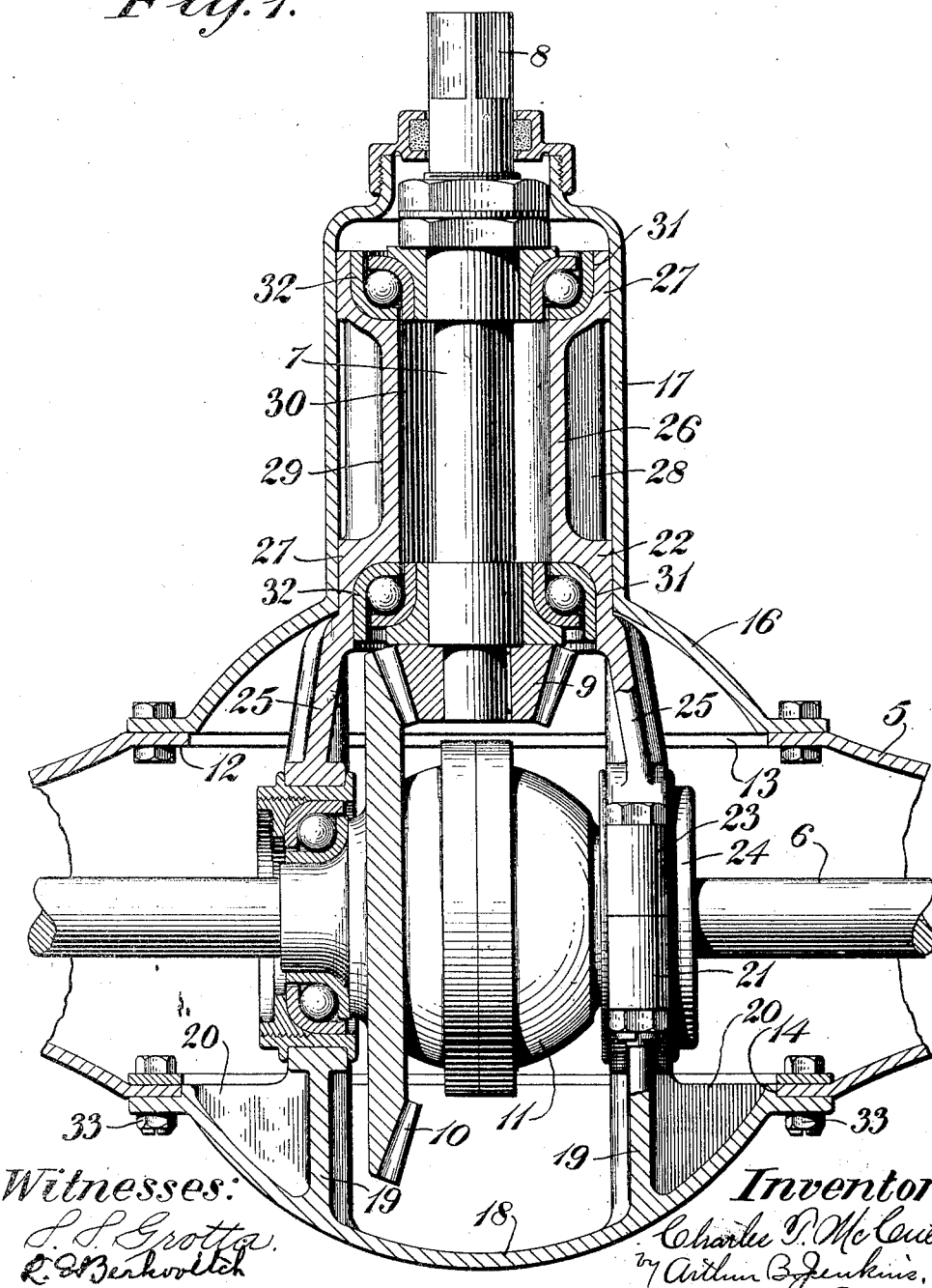

C. T. McCUE.
GEARING.
APPLICATION FILED AUG. 19, 1909.

1,002,858.

Patented Sept. 12, 1911.
2 SHEETS—SHEET 1.

Witnesses:
S. S. Grotta.
R. Berkovitch.

Inventor:
Charles T. McCue.
by Arthur B. Jenkins,
Attorney.

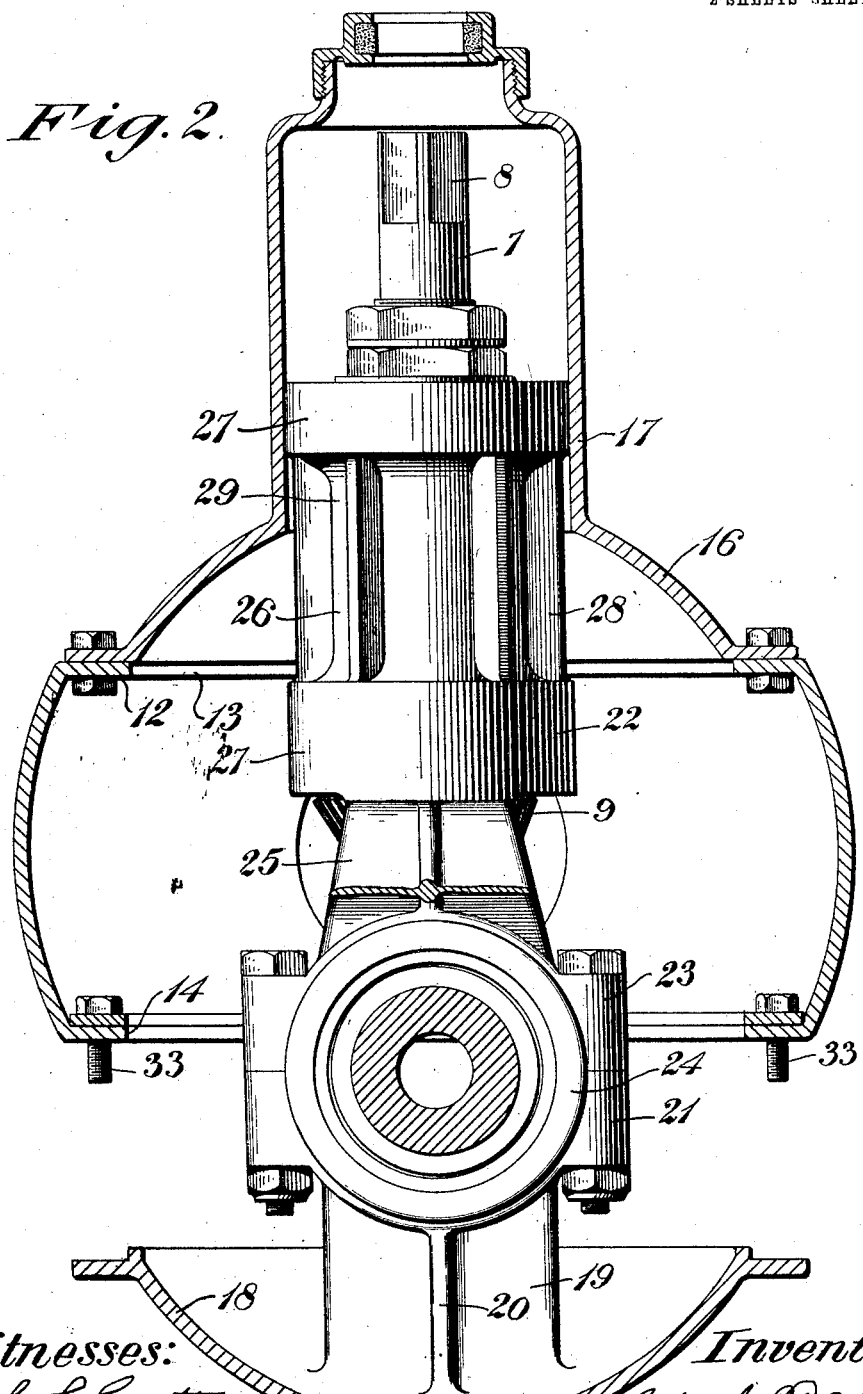

UNITED STATES PATENT OFFICE.

CHARLES T. McCUE, OF HARTFORD, CONNECTICUT.

GEARING.

1,002,858.　　　　Specification of Letters Patent.　　Patented Sept. 12, 1911.

Application filed August 19, 1909. Serial No. 513,716.

*To all whom it may concern:*

Be it known that I, CHARLES T. McCUE, a citizen of the United States, and a resident of Hartford, in the county of Hartford and State of Connecticut, have invented a new and Improved Gearing, of which the following is a specification.

My invention relates to the class of devices herein set out, and the object of the invention is to provide a device of this class having novel features of advantage and utility.

A form of device in the use of which these objects may be attained is illustrated in the accompanying drawings, in which—

Figure 1 is a view partially in central longitudinal section through a portion of an axle housing embodying my invention. Fig. 2 is a view in cross-section through the housing showing the mechanism partially drawn out, the bevel gear on the live axle being removed.

The invention, shown herein as applied to an axle of the kind used in motor vehicle construction, to which construction the invention is especially applicable, although not limited to such, embodies means whereby the mechanism connecting the motor with the driving shaft or live axle is made readily accessible, the invention in fact contemplating a structure in which such parts may be removed from the vehicle without the disarrangement of many other parts of the structure and without disturbing the connection between the body or frame and without having access underneath the vehicle.

In the accompanying drawings the numeral 5 denotes an axle housing of tubular form and of ordinary construction and which is supported usually by the traction wheels of the vehicle mounted upon the ends of said axle. A driving shaft or live axle 6 projects through this housing, being properly connected at its ends with the wheels which are rotated thereby, this driving shaft or live axle being constructed in two sections connected with the propeller shaft 7. This propeller shaft is suitably formed as at 8 for connection with the motor shaft, transmission gearing or like devices from which it is driven, and has a beveled pinion 9 meshing with a beveled gear 10 arranged to drive one of the sections of the shaft 6 and connected with the other section as by means of compensating mechanism located within a shell 11 both sections of the shaft, of course, being driven in the same direction.

All the parts above described are of old and well-known construction, forming of themselves no part of my invention, and further and detailed description is therefore deemed unnecessary herein.

In carrying out my invention the housing is enlarged at about its center, the part being indicated by the numeral 12 and through this enlargement on diametrically opposite sides I provide openings 13—14, these openings being so arranged that when the housing is in position in the vehicle they will be in a practically parallel line with the vehicle body. A cap 16 is secured to the housing to cover the opening 13, which when the housing is in place opens toward the center of the vehicle, and this cap has a neck 17 within which the bearings and other parts appurtenant to the propeller shaft 7 are located. The opposite opening 14 is covered by a supporting cap 18 which is secured to the housing and formed to cover said opening.

The cap 18 is of dish-shape and has standards 19 rising therefrom, these standards being preferably integrally formed with the cap and having webs 20 connecting the upright portion of the standards with said cap. The upper ends of the standards are provided with ears 21 forming seats for a pedestal 22, the base 23 of the pedestal being connected to the ears 21 as by means of bolts and nuts, as plainly shown in the drawings. This base of the pedestal is made up of legs 25, the lower ends of which together with the ears 21 are formed to receive bearings 24 of any approved form and construction for the driving shaft sections 6. These legs are located at some distance apart, as shown in Fig. 1 of the drawings, the pinion 9, gear 10 and compensating mechanism being located between these legs. The legs 25 are attached to and form a support for a sleeve 26, these parts preferably being integral, the legs merging into the sleeve. This sleeve is enlarged preferably at its ends as at 27 to fit within the neck 17, the latter thus serving as a bearing for said sleeve. In the preferred form of construction webs 28 extend from the smaller portion 29 of the sleeve outward for strengthening purposes.

The sleeve has an opening 30 through which the propeller shaft 7 extends and this opening is flared at the ends, and within the enlargements as at 27. Within these enlarged mouths 31 bearings generally indicated by the numeral 32 of any approved form and construction are located for the rotating support of the propeller shaft 7.

It will thus be seen from this construction that all of the mechanism located within the neck 17 and the central portion of the axle housing is supported on the cap 18, which is removably secured to said axle housing. By loosening the bolts 33 securing the cap to the housing, the sections 6 of the driving shaft having previously been withdrawn from the bearings 24, the whole mechanism including the bearings for the propeller shaft and the compensating mechanism may be drawn out from the shell or casing. This cap 18 being located at the rear of the axle housing, it is easily accessible for this purpose, and the parts may thus be readily withdrawn at the rear of the vehicle and without disturbing other parts than those immediately connected with the mechanism herein described.

While I have shown and described herein one form of device embodying my invention, this may be altered to a greater or lesser extent without departing from the spirit and scope of the invention, and I do not therefore limit myself to the exact construction herein shown and described.

I claim—

1. An axle housing forming a casing with a neck extending from one side and an opening located opposite said neck at the back of the axle housing, a cap closing said opening, and shaft bearings arranged to be located in said neck, said bearings being secured to said cap.

2. An axle housing forming a casing with a neck extending from one side and an opening located opposite said neck at the back of the axle housing, a cap closing said opening, and shaft bearings secured to said cap and including a sleeve arranged to be located in said neck.

3. An axle housing forming a casing with openings located in opposite sides thereof, a cap closing one of said openings and having a neck extending therefrom, a supporting cap closing the other opening at the back of the axle housing, and shaft bearings arranged to be located in said neck, said bearings being secured to said cap.

4. An axle housing forming a casing with an opening on opposite sides thereof, a cap closing one of said openings and having a neck projecting therefrom, a supporting cap closing the opposite opening at the back of the axle housing, and shaft bearings secured to said supporting cap and including a sleeve removably located in said neck.

5. An axle housing forming a casing with a neck extending from one side and an opening in said casing at the back thereof, a supporting cap for closing said opening, driving shaft bearings rigidly secured to said cap, and propeller shaft bearings also rigidly secured to said cap and arranged to be located in said neck.

6. An axle housing forming a casing with a neck extending therefrom and an opening in said housing at the back thereof and opposite said neck, a supporting cap for closing said opening, and a support extending from said cap and secured thereto to receive driving shaft bearings and also to receive bearings for a propeller shaft.

7. An axle housing forming a casing with a neck extending therefrom, said casing having an opening, a supporting cap to close said opening, said cap having an extension formed and located to receive and support driving shaft bearings, and a sleeve to be located in said neck and arranged to receive propeller shaft bearings.

8. An axle housing forming a casing with a neck extending from one side and an opening into said casing at the back and opposite said neck, a supporting cap arranged to cover said opening and having standards secured thereto, and a pedestal removably secured to said standards and having bearings for a propeller shaft.

9. An axle housing forming a casing with a neck extending from one side thereof, and an opening into said housing at its back opposite said neck, a supporting cap to close said opening and having standards secured to and rising from said cap and forming a portion of driving shaft bearings, and a pedestal formed to constitute the other part of the driving shaft bearings and constituting a sleeve to be located in said neck and arranged to receive propeller shaft bearings.

10. An axle housing forming a casing with a neck extending from one side and with an opening in said casing at its back opposite said neck, a supporting cap closing said opening and having standards rising from and secured to said cap and formed into bearings, a pedestal including legs formed into bearings complemental to those on said supports, and a sleeve arranged to be located in said neck, said sleeve being rigidly secured to said legs.

11. An axle housing forming a casing with a neck extending from one side and an opening into said casing at its back opposite said neck, a supporting cap for said opening said cap having standards extending from and secured to said cap and formed as part of a bearing, and a sleeve arranged to be located in said neck and with its lower part formed into branching legs, the lower ends of the legs having complemental parts of the bearings located in said standards.

12. An axle housing forming a casing with a neck extending from one side thereof and an opening into said casing at its back opposite said neck, a supporting cap to close said opening said cap having standards rising from and secured to said cap and having supporting webs connecting the standards and the cap, portions of bearings formed in said standards, a sleeve arranged to be located in said neck and having its lower end formed into complemental parts of said bearings on the standards, and means for securing said sleeve to said standards.

13. An axle housing forming a casing with a neck extending from one side and an opening through said housing at its back and located opposite said neck, a supporting cap closing said opening and having standards rising from and secured to said cap and forming parts of shaft bearings, and a sleeve having legs located opposite said standards and formed with complemental parts of said shaft bearings, said sleeve being arranged to be located in said neck and to contain shaft bearings.

14. An axle housing forming a casing with openings on opposite sides thereof, a cap removably secured to one of said openings and having a neck projecting therefrom, a supporting cap secured to the opposite opening at the back of the housing and having standards rising therefrom and secured thereto, said standards being formed for the reception of shaft bearings, and legs located opposite said standards and formed to receive shaft bearings, said legs terminating in a sleeve arranged to receive shaft bearings and to be located in said neck.

15. An axle housing forming a casing with an opening at its back and another opening opposite thereto at its front side, a cap closing said opening at the front of the housing and having a neck, said cap and neck being formed of a single piece, a cap closing the opening at the back of the housing, a sleeve formed of a single piece of metal and rigidly connected to the cap closing the opening at the back of the housing, shaft bearings located at opposite ends of said sleeve, and driving mechanism supported by said bearings.

CHARLES T. McCUE.

Witnesses:
ARTHUR B. JENKINS,
LENA E. BERKOVITCH.